United States Patent [19]

Hess

[11] Patent Number: 4,904,358

[45] Date of Patent: Feb. 27, 1990

[54] GOLD AND SILVER RECOVERY PROCESSES BY ELECTROLYTIC GENERATION OF ACTIVE BROMINE

[75] Inventor: Peter L. Hess, Coeur d'Alene, Id.

[73] Assignee: Inland Aqua-Tech Co., Inc., Spokane, Wash.

[21] Appl. No.: 156,321

[22] Filed: Feb. 16, 1988

[51] Int. Cl.$^4$ .............................................. C25C 1/20
[52] U.S. Cl. ...................................... 204/111; 75/102; 75/118 R
[58] Field of Search .............. 204/111; 75/102, 118 R

[56] References Cited

U.S. PATENT DOCUMENTS

| | | | |
|---|---|---|---|
| 568,741 | 10/1896 | Cassel | 204/111 |
| 732,709 | 7/1903 | Cassel | 204/111 |
| 775,597 | 11/1904 | Cassel | 204/111 |
| 1,397,684 | 11/1921 | Hahn | 75/102 |
| 2,283,198 | 5/1942 | Fink et al. | 75/102 |
| 4,269,622 | 5/1981 | Kerley, Jr. | 75/103 |
| 4,557,759 | 12/1985 | McGrew et al. | 75/118 R |
| 4,637,865 | 1/1987 | Sergent | 204/111 |

OTHER PUBLICATIONS von Michaelis, Hans, "Alternative Leach Reagents," E&MJ, Jun. 1987, pp. 42, 43, 44 and 47.
Scheiner, B. J., "Carbonaceous Gold Ores".
Fast, "John L., Glycol Stripping-a Visable Option for Recovering Gold from Carbon," E&MJ, Jun. 1987, pp. 48-49.
Dayton, Stanley H., "Gold Processing Update," E&MJ, Jun. 1987, pp. 25-29.

Primary Examiner—John F. Niebling
Assistant Examiner—David G. Ryser
Attorney, Agent, or Firm—Wells, St. John & Roberts

[57] ABSTRACT

The invention comprises leaching of ore or other materials containing gold and/or silver with an electrolyzed sodium bromide solution. A quantity of electric current is passed through a volume of 5% to 50% by weight sodium bromide solution to generate a quantity of active bromine. The active bromine oxidizes available gold to a solubilized or complexed form of $AuBr_3$, or available silver to a solubilized or complexed form of $AgBr$. Gold or silver are separated therefrom in a manner which also generates $Br^-$ ions in solution. The $Br^-$ ion containing solution is combined with the 5% to 50% NaBr solution to make the $Br^-$ ions in such solution available for electrical regeneration into active bromine. Only in minimal, if any, amount of bromine from the 5% to 50% NaBr solution is depleted in the process.

18 Claims, 2 Drawing Sheets

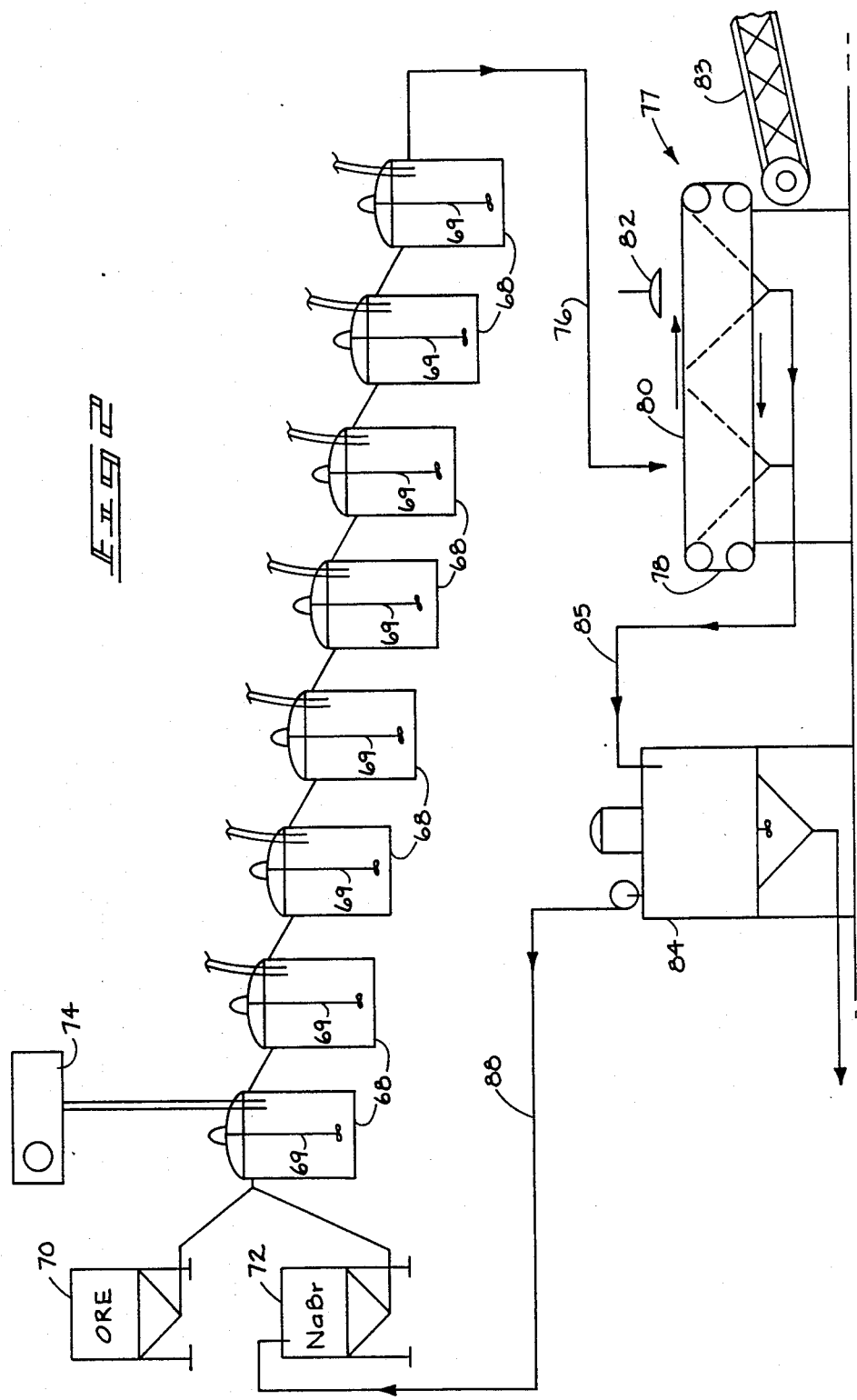

GOLD AND SILVER RECOVERY PROCESSES BY ELECTROLYTIC GENERATION OF ACTIVE BROMINE

TECHNICAL FIELD

This invention relates to non-cyanide processes for recovering gold or silver from material containing gold or silver.

BACKGROUND OF THE INVENTION

Gold is widely dispersed throughout the earth's crust. Naturally occurring metallic, or native, gold usually contains variable amounts of silver, copper, platinum, palladium, or certain other elements mixed with it. Gold is typically recovered by placer mining of alluvial deposits, by load or vein mining, and as a by-product of base-metal mining.

Placer mining, the oldest method, entails exploiting the high density of gold to separate it from the much lighter siliceous material with which it is found. The alluvial deposits mined by placer methods are the gold-bearing sands and gravel that have been deposited by rapidly moving streams and rivers at places where they widen or for some other reason lose speed. As the current slows, the sediment being carried downstream settles to the bottom.

Silver, unlike gold, is found in many naturally occurring minerals. However, most of the silver (as well as gold) produced today is recovered as a by-product of the treatment of copper, lead and zinc ores from load mining. Tremendous tonages of gold and silver containing ore are treated throughout the world since most ores contain an extremely low percentage of gold and silver. For example, as much as ten to twenty tons of ore might be processed for every ounce of silver and gold obtained.

The cyanide process, introduced in the late 1800's, is still generally used for recovering gold and silver from ores. With such process, the ore is pulverized and leached with a dilute sodium cyanide water solution. The silver and gold form water soluble sodium-silver- and sodium-gold complexes. The mixture is held for several hours in large tanks equipped with agitators. The finished mixture is filtered and the solids discarded. The filtrate is generally treated with finely divided zinc dust that causes the silver and gold to precipitate from the solution. This precipitate is filtered off, silver and gold separated, melted, and cast into bullion bars.

The use of cyanide leaching is typically considered as being primarily useful on oxide type (nonsulfide containing) ores. Sulfide ores tend to give up their values very reluctantly and at higher costs. Where sulfides are present, they are typically removed from ores by roasting (smelting). However, dealing with the pollution can be very expensive. Environmental Protection Agency regulations in some cases have become so stringent that costs for compliance to minimize pollution have made many deposits uneconomical.

Further, cyanide is a dangerous substance that when not properly used is a threat to human life. Safe use of cyanide in the gold and silver recovery processes requires maintenance of a pH of at least 10½. Cyanide at lower pH's releases cyanide gas which can be fatal when coming into contact with humans.

Carbonaceous ores typically contain graphitic or activated carbon, and long chain organic compounds similar to humic acids. Adsorption of gold or gold cyanide complexes onto the carbonaceous material interferes with the recovery of gold from carbonaceous ores. As such, carbonaceous ores are not readily treatable with cyanide until the carbon is removed, such as by roasting.

Non-cyanide leaching agents and processes have been developed, but are not widely used for gold and silver recovery at this time. For example, thiourea has been demonstrated to be a successful leachant for the recovery of precious metals. However, to be useful the reactant mixture must be kept at a low pH of around 1.4. At high pH, thiourea is rapidly oxidized to sulphur. Further, gold and silver thiourea complexes are cationic and are strongly absorbed into clay minerals. These factors and the high cost of thiourea have prevented its use in commercial production.

It would be desirable to develop improved processes for recovering gold and silver that do not require the use of cyanide. Such processes would also preferably eliminate substantially all of the problems regarding air, water and soil pollution, and at the same time effectively function to recover gold and silver at a low cost so as to be competitive in the marketplace.

BRIEF DESCRIPTION OF THE DRAWINGS

The preferred embodiment of the invention is illustrated in the accompanying drawings, in which:

FIG. 2 is a diagrammatic or schematic illustration of a non-batch, flow process usable for separating silver and gold in accordance with the invention.

DETAILED DESCRIPTION OF THE PREFERRED EMBODIMENT

Figure 1:
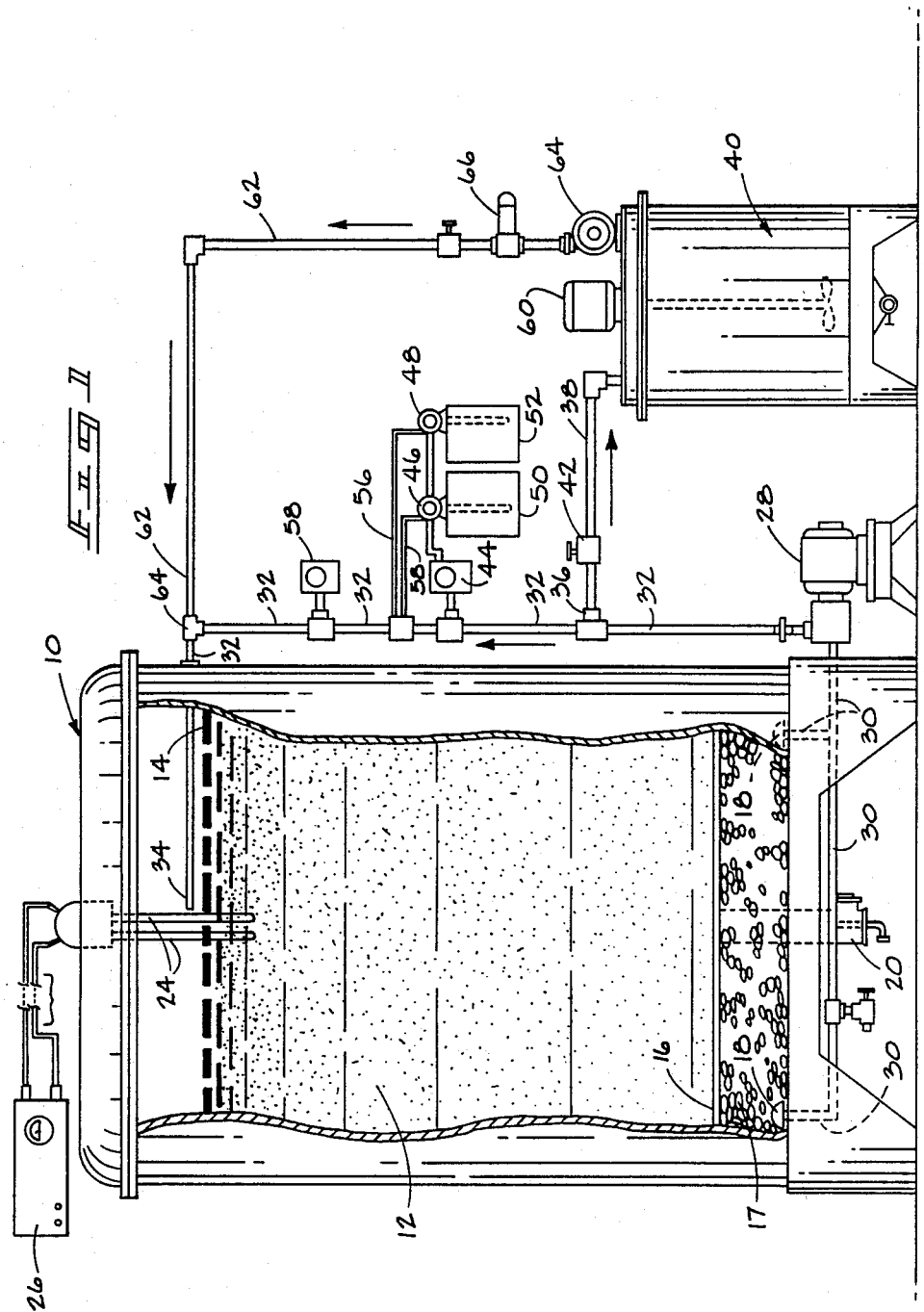
FIG. 1 is a broken, side elevational view of an apparatus usable for carrying out a process in accordance with the invention.

The following disclosure of the invention is submitted in compliance with the constitutional purpose of the Patent Laws "to promote the progress of science and useful arts" (Article 1, Section 8).

The invention comprises leaching of ore or other material containing gold and/or silver with an electrolyzed sodium bromide solution. A quantity of electric current is passed through a volume of 5% to 50% by weight sodium bromide solution to generate a quantity of "active" bromine dissolved in solution. The chemistry is represented as follows:

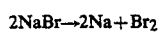

Elemental sodium and bromine are extremely reactive substances with water, and summarily react as follows:

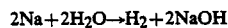

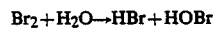

The HOBr shown is the "active" bromine form referred to above. Active bromine will be present in either the illustrated HOBr form or in NaOBr form, depending upon the pH of the solution. The pH of the solution will be dependent in large part upon the composition of the ore or other material being leached. The equilibrium chemistry between HOBr and NaOBr can be represented as follows:

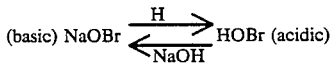

The tendency of the reaction is toward production of HOBr where the pH of the reactant solution naturally occurs or is maintained at approximately 9.0 or below. It is preferable that pH be at 9.0 or below to maintain a substantial quantity of the active bromine in HOBr form.

In accordance with the invention, the material containing the gold or silver is combined with the electrolyzed sodium bromide solution, or a mixture of the sodium bromide solution and material is electrolyzed in situ. The active bromine functions to oxidize a substantial portion of any base metal sulfides present in the material into acid soluble base metal compounds, and further to oxidize available gold to $AuBr_3$ or available silver to $AgBr$. Typical base metal sulfides present in ores include: $FeS_2$, $Cu_2S$, $CuS$, and $PbS$.

The oxidation reactions of the active bromine in HOBr form with gold and silver are represented as follows:

$$3HBr + 2Au + 3HOBr \rightarrow 2AuBr_3 + 3H_2O$$

$$HBr + 2Ag + HOBr \rightarrow 2AgBr + H_2O$$

The solubility of $AuBr_3$ and $AgBr$ in water is less than desirable. However, solubility is significantly aided by the presence of the bromide ion in solution, as represented as follows:

$$AuBr_3 + Br^- \rightarrow AuBr_4^- \text{(soluble)}$$

$$AgBr + Br^- \rightarrow AgBr_2^- \text{(soluble)}$$

Accordingly, the $AuBr_3$ and $AgBr$ generated is substantially complexed into a soluble form with the NaBr in solution, and thereby creates a pregnant NaBr solution.

The base metal sulfides present in the ore are acid producing substances upon oxidation. Oxidation of the above typical base metal sulfides would be expected as follows:

$$4H_2O + 2FeS_2(solid) + 15HOBr \rightarrow Fe_2O_3(soluble) + 4H_2SO_4 + 15HBr$$

$$H_2O + Cu_2S(solid) + 5HOBr \rightarrow 2CuO(soluble) + H_2SO_4 + 5HBr$$

$$H_2O + CuS(solid) + 3HOBr \rightarrow CuO(soluble) + H_2SO_4 + 3HBr$$

$$H_2O + PbS(solid) + 3HOBr \rightarrow PbO(soluble) + H_2SO_4 + 3HBr$$

Oxidation of substantially all the sulfides is desirable to prevent any soluble gold or silver from being re-precipitated, which would prevent optimum recoveries and occur for example as follows:

$$57H_2O + 16AuBr_4^-(\text{soluble}) + 6FeS_2 \rightarrow 16Au(\text{solid}) + 3Fe_2O_3 + 12H_2SO_4 + 48HBr + 16Br^-$$

As is apparent from the above, oxidation of the base metal sulfides produces acid soluble base metal oxides. Accordingly, the pregnant NaBr solution contains both dissolved base metal compounds and dissolved $AuBr_3$ or $AgBr$ where significant quantities of base metal sulfides are present in the gold and/or silver containing material.

Where substantially no or only a negligible amount of base metal sulfides are present in the material being leached, substantially no or only a negligible amount of base metal compounds will be generated. Under these conditions, the pertinent dissolved metals will be primarily Au and Ag in complexed form.

The content of various materials in the ore will dictate what effects will occur to pH, and whether addition of acid is necessary. While it is desirable to maintain a pH of the leaching solution at or below 9.0, a pH of 4.0 to 8.0 is expected to be preferred for most oxidized or low sulfide content ores. Best results are expected to be obtained for a pH maintained between 6.5 and 7.5. Where it is necessary to add an acid to maintain the pH in this preferred range, the preferred acids are either hydrobromic or hydrochloric acid.

Where a basic substance is necessary for pH control, lime is preferred. Lime is added as either calcium hydroxide ($Ca(OH)_2$), calcium oxide (CaO) or limestone ($CaCO_3$). Addition of lime provides the distinct advantage of precipitating the base metal compounds out of solution as hydroxides such as for example:

$$Fe_2O_3(\text{soluble}) + 3H_2SO_4 + 3Ca(OH)_2 \rightarrow 3CaSO_4 \downarrow + 2Fe(OH)_3 \downarrow + 3H_2O$$

$$CuO(\text{soluble}) + H_2SO_4 + Ca(OH)_2 \rightarrow CaSO_4 \downarrow + Cu(OH)_2 \downarrow + H_2O$$

$$PbO(\text{soluble}) + H_2SO_4 + Ca(OH)_2 \rightarrow CaSO_4 \downarrow + Pb(OH)_2 \downarrow + H_2O$$

Where lime is added for pH control or for precipitation purposes, pH is again preferable at between 4.0 to 8.0, with 6.5 to 7.5 expected to be most preferred.

The base metal precipitate is filtered from the pregnant solution. Next, gold is separated from the complexed $AuBr_3$ or silver from the complexed $AgBr$ in the pregnant solution while simultaneously generating $Br^-$ ions in solution also from the complexed $AuBr_3$ or complexed $AgBr$. This can be accomplished by, for example, precipitating gold and silver with zinc, or passing the pregnant solution through a resin which has substantially the same effect of separating elemental gold and silver while simultaneously generating $Br^-$ ions.

The $Br^-$ ion containing solution is collected or separated from the elemental gold or silver, and thereafter recombined with the volume of 5% to 50% NaBr solution. This makes the $Br^-$ ions in such solution again available for electrical regeneration into active bromine whereby only a minimal, if any, amount of bromine is depleted in the process. In other words the process is regenerative; it consumes electricity, pH control compounds, and materials that assist in separating gold and silver from the leach solution (i.e. zinc) but very little, if any, bromine. Any bromine consumed would be lost either by vaporization or possible in liquid form due to surface tension adherence to the precipitate as the result of inadequate washing.

Many process parameters, such as particle size, slurry temperature, pH, percent sodium bromide, leach time, etc., will enter into the percent recovery that can be expected from a given ore. It is anticipated that a given ore will be put through a series of trial runs to determine the optimum process parameters to determine the preferred conditions for a given ore. Optimum temperatures are expected to fall anywhere between 30° F. and 180° F. The material may or may not be agitated during leaching. For example, oxide or placer ores are typically leached without agitation, whereas high sulfide containing ores are agitated during leaching.

Sodium bromide concentrations anticipated to be usable with the invention might range anywhere from 5% to 50%. Lower percentage solutions obviously decrease the cost incurred for sodium bromide. However, low sodium bromide concentrations also reduce the conductivity of the leaching solution and therefore increase the amount of electricity required to generate a sufficient quantity of active bromine. Also, low sodium bromide concentration solutions result in reduced solubility of the AgBr and $AuBr_3$, particularly the AgBr, and would be expected to significantly reduce recovery.

The quantity of electric current passed through the leaching solution preferably generates a sufficient quantity of active bromine to convert a substantial portion of the available gold in the material to $AuBr_3$ or available silver in the material to AgBr. However, the quantity of electric current preferably is not so great to create an excessive quantity of active bromine. This would waste electricity and consume other process components in the process step where gold is separated from complexed $AuBr_3$ or silver is separated from complexed AgBr. For example, zinc in the precipitation stage converts any excess HOBr back into $Br^-$ ion in solution. Accordingly, in addition to excess consumption of electricity resulting from the generation of excess HOBr, more zinc than necessary would be consumed in the zinc precipitation stage of the process. The optimum quantity of electricity required for generating a desired amount of active bromine could also be determined by trial and error to optimize silver and gold recovery with a minimum consumption of electricity.

Typically, the quantity of active bromine generated will be small in comparison to the concentration of available bromine ion in solution. For example, the concentration of active bromine generated and maintained by the electricity at any given time within a 15% sodium bromide solution (150,000 ppm) would typically be in the 50 ppm to 500 ppm range.

FIG. 1 illustrates process components usable for carrying out a gold and silver separative process in accordance with the invention. A large tank 10 is employed for retaining the material 12 being leached and a sodium bromide solution 14. Tank 10 as shown is adapted primarily for leaching placer sand concentrate, but could be adapted for other ores as will be described in the following description. Adjacent the bottom portion of tank 10 is a thin liquid permeable membrane or transfer media 16. Large river cobble agglomerate 17 is received below and supports sheet 16. A plurality of outlet nozzles 18 extends upwardly into tank 10 from its bottom and into river cobbles 17. Transfer media 16 functions to retain and separate material 12 above cobbles 17, yet allows liquid to flow to outlet nozzles 18. A waste discharge pipe or drain 20 extends upwardly from the bottom central portion of tank 10 up to and through permeable sheet 16. This enables the liquid-solid mixture to be drained from the tank when leaching is complete. The leaching liquid would then be recovered by filtration for reuse.

A pair of carbon electrodes 24 extends into the upper portion of tank 10. Electrodes 24 are connected to a rectifier 26 for supplying a DC current to the electrolyte in the tank.

A pump and motor combination 28 is employed for circulating the sodium bromide solution through tank 10. Nozzles 18 at the bottom of tank 10 are connected by pipes 30 to the inlet portion of pump/motor 28. A pump outlet pipe 32 extends from the outlet portion of pump 28 and extends to the upper portion of the tank. A discharge end 34 of pipe 32 is positioned above the solution level within the tank.

Pump discharge pipe 32 includes a "T" 36 which connects with a pipe 38 that feeds a zinc precipitator tank 40. A valve mechanism 42 is included in pipe 38 for regulating flow of fluid to zinc precipitator tank 40. Zinc precipitator tank 40 is smaller than tank 10 and includes an agitator 60. Fluid is pumped from zinc precipitator tank 40 through a pipe 62 by means of a pump 64. Pipe 62 combines at a "T" 64 with line 32 at the elevation where it extends into the upper portion of tank 10. A cartridge filter 66 is included in pipe 62 for filtering any solid material.

A pH sensor 44 connects with pipe 32 downstream of "T" 36. Sensor 44 is electrically connected to a pair of adjustment feed pumps 46, 48 mounted atop a pair of acid and base retaining tanks 50, 52, respectively. An outlet pipe 54 or 56 extends from feed pumps 46 or 48 respectively, and connects with pipe 32 downstream of pH sensor 44. A sensor 58 also connects with pipe 32 downstream of pH sensor 44 and monitors active bromine (NaOBr and HOBr) content of the solution flowing through pipe 32.

A typical batch process in accordance with the invention for leaching gold and silver values could occur as follows. Pump motor 28 would be engaged to start the sodium bromide solution circulating through pipe 32 and flowing from the top to the bottom of tank 10 through the product being leached. Electricity is introduced into the flowing leach solution by means of rectifier 26 and electrodes 24. This electrolyzes the sodium bromide into an active form (NaOBr and HOBr) to form $AuBr_3$ and AgBr which is solubilized by the sodium bromide solution into a soluble complexed form. Electricity would continue to be applied until a perceived sufficient amount of active bromine had been generated, and then the electricity turned off. Circulation would continue for a sufficient period of time to enable the available silver and gold to be solublized into complexed $AuBr_3$ and AgBr. The pH would be maintained as desired by means of pH sensor 44 and adjustment feed pumps 46 or 48.

For leaching of placer or oxidized ores, as illustrated in FIG. 1, the electrolysis reaction typically tends to be alkaline because of the absence of acid producing substances. The pH would typically be maintained by the addition of hydrobromic or hydrochloric acid from tank 50. Sulphuric acid is preferred where carbonaceous ores are being leached. The pH would preferably be maintained in an outside range of 4 to 8. A pH much above 8 tends to precipitate a substantial quantity of the gold and silver back into the ore being leached. A pH much below 4 would put iron, lead, copper and other base metal compounds into solution, which would make final recovery of the gold and silver from the pregnant solution more difficult. Final pH is preferably adjusted in the 4 to 6 range.

The electrolyzed sodium bromide solution with active bromine is circulated through the ore for a sufficient period of time to convert substantially all of the available silver and gold to a solubilized complexed form. The amount of time required is something that is either arrived at from experience with the process with various ore types, or empirically determined by running samples of the particular ore being leached. After the perceived sufficient period of time has elapsed, the amount of active bromine remaining in the circulating leach solution is measured. If no or a negligible amount of the active bromine remains, not enough was initially generated to react with all of the available gold and silver in the ore. Accordingly, more electricity would be added to generate more active bromine and the system continued to circulate.

If active bromine is detected after a running period believed to be sufficient to convert all available silver and gold into solubized form, this would indicate that substantially all available silver and gold has been leached from the ore. As described above, it would be desirable to determine optimum conditions and the necessary leaching time to minimize generation of excess active bromine which would serve to consume extra, nonrequired quantities of electricity.

After a substantial quantity of the available gold and silver has been determined to be leached from the ore, valve 42 is opened to cause the leaching solution to flow to zinc precipitator 40. Here, zinc is added for separating gold from the solution while simultaneously generating bromine ion. The solution containing bromine ion is sent back to tank 10 by pump 64 and pipe 62 where it can be reused, while the gold or silver is collected from the bottom of precipitator tank 40. The leached liquid-solid mixture in tank 10 is then drained, with the solution thereafter being separated from the solid. The leaching tank 10 can then be recharged with the same sodium bromide solution and another batch of ore to be leached. As will be apparent, substantially all of the sodium bromide is recoverable from such a process. As will also be apparent, base metals could also be recovered by collecting and treating the oxidized base metal sulfides.

FIG. 1 illustrates process components configured for leaching of placer ores. To leach high sulfide content ores, such ores are typically finely ground and would be agitated with an agitator extending into the leach tank. Sulfide compounds present in the sulfide ores tend to produce sulfuric acid which lowers the pH over time and solubilizes the base metal compounds, as described above. To prevent pH from falling too low (i.e. below 2.0) lime is added to both maintain pH and precipitate the base metals from solution. As with the placer set up, pH is preferably finally adjusted to between 4 and 6. The pregnant solution would be separated from the pulp by filtration. The gold and silver would be recovered as with the placer setup with zinc precipitation, resins or other methods.

EXAMPLE 1

Approximately 800 pounds of a placer sluice concentrate containing mostly black (iron oxide) sands and visible gold (up to ⅛ inch diameter) were loaded into a 90 gallon fiberglass tank. Ten gallons of a 10% sodium bromide solution was added to the tank, and such solution continually circulated through the material using an apparatus similar to that shown in FIG. 1. Temperature was maintained at 40°-60° F. A DC electric current of 12 volts at 6 to 8 amps was passed between two 8-inch carbon electrodes extending into the top of the tank. This current was applied for 30 minutes every 24 hours. Hydrochloric acid was added occasionally to the tank to maintain a pH of 6.5 to 7.5. Once a week, the pregnant solution was drained into a separate zinc precipitation tank and agitated with about 10 grams of powdered zinc metal. After one month of circulation, the total gold recovery was 12.4 grams, or 0.437 ounce. Examination of the leached material failed to reveal any remaining visible gold. A head fire assay of the placer material tested was taken by driving a ½ inch pipe through the material prior to leaching. The assay provided a rough gold content of 1.12 ounces per ton, which would equal 0.448 ounce in the 800 pounds that was leached. Therefore based on the head assay and gold recovered, the leach achieved approximately 98.2% gold recovery.

EXAMPLE 2

Approximately 204 grams of a sulfide flotation cell concentrate were ground to 100 mesh and agitated with a 30% sodium bromide solution. Slurry temperature was maintained at 160° F. to 180° F., and a DC electric current of 4 volts at 7 amps passed through the slurry for 10 hours. Lime (CaO) was added to the slurry to maintain pH in the range of 4 to 6. After 10 hours, the slurry was vacuum filtered and the resultant cake rinsed with deionized water. The filtered (pregnant) solution was collected and precipitated with powdered zinc. The results were as follows:

|  | Head Assay | Tail Assay | Recovered Metals | % Recovery Determined From Tail Assay | % Recovery By Actual Metal Weights |
|---|---|---|---|---|---|
| Au- | 26.158 oz/ton | 0.870 oz/ton | 181.615 mg | 96.7% | 99.2% |
| Ag- | 64.06 oz/ton | 0.60 oz/ton | 452.8 mg | 99.1% | 101.0% |

EXAMPLE 3

Approximately 526 grams of a carbonaceous ore were ground to 100 mesh and agitated with 3.0 liters of a 30% sodium bromide solution. A DC current of 6 amps at 6 volt was passed through the slurry using carbon electrodes for 2 hours, and the temperature of the slurry brought to 160° F. The pH of the solution was maintained at approximately 6 by the addition of $H_2SO_4$. The slurry was filtered and the resultant cake rinsed with deionized water. The filtered (pregnant) solution was collected and treated with powdered zinc to precipitate gold and silver. The head assay of gold was determined to contain 0.047 oz/ton while silver content was 0.10 oz/ton. No silver or gold was detectable in the tail assay after the above treatment indicating near 100 percent recovery.

The above described processes have primarily focused upon batch processes although flow processes would also be employable in accordance with the invention. For example, FIG. 2 illustrates a continuous flow, non-batch, process. With a continuous flow process, a series of elevational cascading leaching tanks 68 would typically be employed as opposed to a single leaching tank. The ore being leached would be fed to tanks 68 from a feed bin 70 containing finely ground ore material. A 5% to 50% sodium bromide solution is also fed to tanks 68 from a sodium bromide tank 72. Tanks 68 would preferably each include an agitator 69 for agitating its contents. A quantity of electric current would be passed through one or more of tanks 68 such as by a rectifier 74. In the depicted embodiment, each tank 68 is illustrated as having electrodes positioned therein for passing a quantity of electric current through each tank. Alternately, as little as one tank, preferably the first tank, could be subjected to electric current for generating the required amount of active bromine which would flow to the other tanks. Whether electricity applied to all tanks or one tank, or some number in between, would produce optimum results was not determined at the time this document was prepared.

Lime would also be introduced somewhere in the series of elevationally cascading tanks to at least one of such tanks for precipitating the base metal compounds from the pregnant NaBr solution created by the active bromine generated from the electric current. The slurry or pulp flowing from the last tank would flow through a line 76 to a filter 77 for separation of the pregnant solution therefrom. For example, the slurry would be ejected onto a belt filter 78 at location 80. A rinse would be applied to the solids by a shower 82 for washing any pregnant solution adhering to the leached ore. The leached ore would fall to a conveyor 83 then transported to recover base metals present in the ore, or discarded as waste.

The filtered pregnant solution is passed by a pipe 85 to a zinc precipitator 84 for separation of gold and silver from the pregnant solution. The precipitate collected would be recovered from the filter for refining. As described above, the zinc precipitator or other separation method that might be employed for separating silver and gold from the pregnant solution, generates $Br^-$ ions in solution. A line 88 would flow from zinc precipitator 84 and be introduced back into the series of elevationally cascading tanks, such as into NaBr tank 72, to make the $Br^-$ ions in such solution available for electrical regeneration into HOBr. Again, only a minimal, if any, amount of bromine would be depleted in the process.

Gold and silver recovery using processes in accordance with the invention could be used on any of a wide variety of material in addition to the earthen material described above.

In compliance with the statute, the invention has been described in language more or less specific as to structural and methodical features. It is to be understood, however, that the invention is not limited to the specific features shown and described, since the means, construction and methods herein disclosed comprise preferred forms of putting the invention into effect. The invention is, therefore, claimed in any of its forms or modifications within the proper scope of the appended claims, appropriately interpreted in accordance with the doctrine of equivalents.

I claim:

1. A process for recovering gold or silver from a material containing gold or silver, the process not requiring use of cyanide, the process comprising the following steps:
    combining the material with a volume of 5% to 50% NaBr solution to produce a mixture of material and NaBr solution;
    passing a quantity of electric current through the mixture of material and NaBr solution to electrochemically generate a quantity of HOBr dissolved in solution within the mixture, the quantity of electric current being applied through the mixture of material and NaBr solution in a single chambered vessel as opposed to a multi-chambered vessel having separate anolyte and catholyte compartments, and thereby;
    oxidizing with HOBr a substantial portion of base metal sulfides present in the material into acid soluble base metal compounds, and;
    oxidizing with HOBr available gold to $AuBr_3$ or available silver to AgBr, the $AuBr_3$ or AgBr present being substantially complexed into a soluble form with the NaBr in solution, and thereby;
    creating a pregnant NaBr solution, the pregnant NaBr solution containing both dissolved base metal compounds and dissolved $AuBr_3$ or AgBr;
    adding lime to the pregnant NaBr solution to precipate the base metal compounds from the pregnant NaBr solution;
    separating gold from the complexed $AuBr_3$ in the pregnant NaBr solution or silver from the complexed AgBr in the pregnant NaBr solution while simultaneously generating $Br^-$ ions in solution from the complexed $AuBr_3$ or complexed AgBr; and
    combining the $Br^-$ ion containing solution with the mixture containing the volume of 5% to 50% NaBr solution and material to make the $Br^-$ ions in such solution available for electrochemical regeneration into HOBr whereby only a minimal amount, if any, of bromine from the 5% to 50% NaBr solution is depleted in the process.

2. The process of claim 1 wherein the quantity of electric current generates a sufficient quantity of HOBr to convert a substantial portion of the available gold in the material to $AuBr_3$ or available silver in the material to AgBr, but not an excessive quantity of HOBr which would consume unnecessary electricity and consume other process components in the process step where gold is separated from complexed $AuBr_3$ or silver is separated from complexed AgBr.

3. The process of claim 1 wherein the step of creating the pregnant NaBr solution includes agitating the mixture of the material and NaBr solution containing dissolved HOBr and maintaining a temperature of such mixture from 30° F. to 180° F.

4. The process of claim 1 wherein pH in the pregnant NaBr solution is maintained at from 4 to 8 by the addition of lime.

5. The process of claim 4 wherein the step of creating the pregnant NaBr solution includes agitating the mixture of the material and NaBr solution containing dissolved HOBr and maintaining a temperature of such mixture from 30° F. to 180° F.

6. The process of claim 1 wherein the quantity of electric current generates a sufficient quantity of HOBr to convert a substantial portion of the available gold in the material to $AuBr_3$ or available silver in the material to AgBr, but not an excessive quantity of HOBr which would waste electricity and consume other process components in the process step where gold is separated from complexed $AuBr_3$ or silver is separated from complexed AgBr;
    wherein the step of creating the pregnant NaBr solution includes agitating the mixture of the material and NaBr solution containing dissolved HOBr and maintaining a temperature of such mixture from 30° F. to 180° F.; and wherein pH in the pregnant NaBr solution is maintained at from 4 to 8 by the addition of lime.

7. The process of claim 6 further comprising separating and collecting the base metals from the oxidized base metal sulfides.

8. The process of claim 1 further comprising separating and collecting the base metals from the oxidized base metal sulfides.

9. A continuous flow, non-batch, process for recovering gold or silver from material containing gold or silver, the process not requiring use of cyanide, the process comprising:

feeding the material to a series of elevationally cascading leaching tanks, the leaching tanks including means for agitating their contents;

simultaneously feeding a stream of 5% to 50% NaBr solution to the series of elevationally cascading leaching tanks to produce a mixture of material and NaBr solution in the leaching tanks;

passing a quantity of electric current through the mixture in one or more of the leaching tanks to electrochemically generate from the 5% to 50% NaBr solution a quantity of HOBr dissolved in solution within the mixture for leaching gold or silver from the material, a significant number of the leaching tanks being single chambered vessels as opposed to multi-chambered vessels having separate anolyte and catholyte compartments, and thereby;

oxidizing with HOBr a substantial portion of base metal sulfides present in the material into acid soluble base metal compounds, and;

oxidizing with HOBr available gold to $AuBr_3$ or available silver to AgBr, the $AuBr_3$ or AgBr present being substantially complexed into a soluble form with the NaBr in solution and thereby;

creating a stream of pregnant NaBr solution flowing from the series of elevationally cascading tanks, the pregnant NaBr solution containing both dissolved base metal compounds and dissolved $AuBr_3$ or AgBr;

introducing lime to at least one of the series of elevationally cascading leaching tanks to precipitate the base metal compounds from the pregnant NaBr solution;

filtering solids from the pregnant NaBr solution flowing from the series of elevationally cascading leaching tanks, and collecting the filtered solution;

separating gold from the complexed $AuBr_3$ in the filtered solution or silver from the complexed AgBr in the filtered solution while simultaneously generating $Br^-$ ions in solution from the complexed $AuBr_3$ or complexed AgBr; and collecting that $Br^-$ ion containing solution and introducing it back into the series of elevationally cascading leaching tanks to make $Br^-$ ions in such solution available for electrochemical regeneration into HOBr within the mixture of material and NaBr solution whereby only a minimal amount, if any, of bromine is depleted in the process.

10. The process of claim 9 further comprising separating and collecting the base metals from the oxidized base metal sulfides.

11. A process for recovering gold or silver from a material containing substantially no or a negligible amount of base metal sulfides, the process not requiring use of cyanide, the process comprising the following steps:

combining the material with a volume of 5% to 50% NaBr solution to produce a mixture of material and NaBr solution;

passing a quantity of electric current through the mixture of material and NaBr solution to electrochemically generate a quantity of HOBr dissolved in solution within the mixture, the quantity of electric current being applied through the mixture of material and NaBr solution in a single chambered vessel as opposed to a multi-chambered vessel having separate anolyte and catholyte compartments;

maintaining the pH of said mixture of material and NaBr solution at from 4.0 to 8.0 by the addition of acid to keep a substantial quantity of an active bromine in HOBr form and thereby;

oxidizing with the active bromine available gold to $AuBr_3$ or available silver to AgBr, the $AuBr_3$ or AgBr present being substantially complexed into a soluble form with the NaBr in solution and thereby;

creating a pregnant NaBr solution containing dissolved $AuBr_3$ or AgBr;

separating gold from the complexed $AuBr_3$ in the pregnant solution or silver from the complexed AgBr in the pregnant solution while simultaneously generating $Br^-$ ions in solution from the complexed $AuBr_3$ or complexed AgBr; and combining the $Br^-$ ion containing solution with the mixture containing the volume of 5% to 50% NaBr solution and material to make the $Br^-$ ions in such solution available for electrochemical regeneration into active bromine whereby only a minimal amount, if any, of bromine is depleted in the process.

12. The process of claim 11 wherein the acid added to maintain pH is selected from the pair consisting of hydrobromic acid or hydrochloric acid.

13. The process of claim 12 wherein the pH of said mixture of material and NaBr containing dissolved active bromine is maintained at from 6.5 to 7.5.

14. The process of claim 11 wherein the pH of said mixture of material and NaBr containing dissolved active bromine is maintained at from 6.5 to 7.5.

15. A process for recovering gold or silver from carbonaceous ore, the process not requiring use of cyanide, the process comprising the following steps:

combining the material with a volume of 5% to 50% NaBr solution to produce a mixture of material and NaBr solution;

passing a quantity of electric current through the mixture of material and NaBr solution to electrochemically generate a quantity of active bromine dissolved in solution within the mixture, the quantity of electric current being applied through the mixture of material and NaBr solution in a single chambered vessel as opposed to a multi-chambered vessel having separate anolyte and catholyte compartments;

maintaining the pH of said mixture of material and NaBr solution at from 4.0 to 8.0 by addition of acid to keep a substantial quantity of the active bromine in HOBr form and thereby;

oxidizing with the active bromine available gold to $AuBr_3$ or available silver to AgBr, the $AuBr_3$ or AgBr present being substantially complexed into a soluble form with the NaBr in solution and thereby;

creating a pregnant NaBr solution containing dissolved $AuBr_3$ or AgBr;

separating gold from the complexed $AuBr_3$ in the pregnant solution or silver from the complexed AgBr in the pregnant solution while simultaneously generating $Br^-$ ions in solution from the complexed $AuBr_3$ or complexed AgBr; and combining the $Br^-$ ion containing solution with the mixture containing the volume of 5% to 50% NaBr solution and material to make $Br^-$ ions in such solution available for electrochemical regeneration into active bromine whereby only a minimal amount, if any, of bromine is depleted in the process.

16. The process of claim 15 wherein the acid added to maintain pH is sulphuric acid.

17. The process of claim 16 wherein the pH of said mixture of material and NaBr containing dissolved active bromine is maintained at from 6.5 to 7.5.

18. The process of claim 15 wherein the pH of said mixture of material and NaBr containing dissolved active bromine is maintained at from 6.5 to 7.5.

* * * * *